United States Patent Office 3,367,986
Patented Feb. 6, 1968

3,367,986
COMPLEX LEWIS ACID CATALYZED AROMATIC HYDROCARBON POLYMERIZATION
Louis De Vries, Richmond, Calif., assignor to Chevron Research Company, San Francisco, Calif., a corporation of Delaware
No Drawing. Filed Apr. 12, 1966, Ser. No. 541,950
6 Claims. (Cl. 260—670)

This invention concerns a novel method of preparing higher molecular weight aromatic hydrocarbons from relatively low molecular weight aromatic hydrocarbons and the compositions obtained thereby. More particularly, this invention concerns a novel method of preparing higher molecular weight aromatic hydrocarbons from lower molecular weight aromatic hydrocarbons using a hydrocarbon soluble Friedel-Crafts catalyst and the compositions obtained thereby.

Polymerizing aromatic hydrocarbons to higher molecular weight aromatic hydrocarbons is generally not readily achievable. Various methods include the Ullman reaction, the double decomposition of didiazobenzenes, $AlCl_3$-$CuCl_2$-benzene. These reactions for the most part do not proceed from the aromatic hydrocarbon but require halogen or amino substituents.

Pursuant to this invention, low molecular weight aromatic hydrocarbons are polymerized to higher molecular weight aromatic hydrocarbons by contacting the aromatic hydrocarbons with a complex aluminum chloride-silver chloride catalyst in the presence of anhydrous hydrogen chloride and a noble metal dehydrogenation catalyst. The reaction is carried out at elevated temperatures and HCl is generally introduced into the reaction mixture during the course of the reaction.

The catalyst, which is soluble in hydrocarbon solvents, particularly aromatic hydrocarbon solvents, is a complex of aluminum chloride and silver chloride. The complex has from about 1 to 5 moles of aluminum chloride to one mole of silver chloride, more usually from about 1.5 to 3 moles of aluminum chloride per mole of silver chloride. Additional aluminum chloride may be added during the course of the polymerization, generally from about 0 to 2 parts of aluminum chloride per part of complex, more usually from about 0.5 to 1.2 parts of aluminum chloride per part of complex catalyst.

The aluminum chloride-silver chloride complex is readily prepared by bringing together neat the aluminum chloride and silver chloride in the absence of oxygen and heating above 125° C. which results in the formation of a clear liquid. The complex catalyst should be protected from water. The catalyst may then be used as desired.

Usually, the complex will be present in an amount of about 1 part to from about 1 to 20 parts of aromatic hydrocarbon, more usually from about 1 part to from about 1 to 10 parts of aromatic hydrocarbon.

The aromatic hydrocarbon which is polymerized is generally of from about 6 to 12 carbon atoms, more usually from about 6 to 10 carbon atoms, and preferably mononuclear (1 ring). The hydrocarbon substitutents on the ring are lower alkyl, i.e., alkyl of from 1 to 6 carbon atoms, usually alkyl of from 1 to 3 carbon atoms and more usually methyl. The rings may be unsubstituted or substituted, when substituted having from 1 to 2 hydrocarbon substituents. A single or mixture of aromatic hydrocarbons may be used; usually, there are from about 1 to 3 aromatic hydrocarbon components in the reaction mixture.

Illustrative hydrocarbons include benzene, toluene, cumene, cymene, naphthalene, biphenyl, indane, tert.-butyl benzene, etc.

The atmosphere in which the reaction is carried out is substantially oxygen free. Inert gases such as nitrogen or hydrogen may be used to maintain the oxygen free atmosphere, but preferably gaseous anhydrous hydrogen chloride is used either by itself or in combination to maintain an oxygen free atmosphere and a supply of hydrogen chloride during the reaction. Conveniently, the hydrogen chloride may be slowly bubbled into the reaction mixture during the course of the reaction.

Also included in the reaction mixture is a noble metal dehydrogenation catalyst, e.g., palladium, rhodium, etc., usually dispersed on a solid support, e.g., charcoal, alumina, diatomaceous earth, etc.; that is, metals of Group VIII, rows 5 and 6 of the Mendeleeff Periodic Chart. The various dehydrogenation noble metal catalysts and supports for these catalysts are well known in the art. While the amount of catalyst is not critical to the invention, the noble metal catalyst will generally be present in amount of from about 0.05 to 1.0 weight percent of the solution, more usually about 0.08 to about 0.5 weight percent of the solution.

For many of the aromatic hydrocarbon reactants, the temperature can be at the reflux temperature or above, usually not exceeding 200° C. Usually, the temperature will be from about 90° C. to about 175° C. The reflux temperature of benzene is about 80° C.

The time for the reaction will be at least about 1 hour and generally not exceed 24 hours, usually in the range of about 3 to 18 hours.

Generally, ambient pressures may be used, e.g., atmospheric, but at the elevated temperatures it may be necessary in order to achieve the desired temperature to have autogenous pressures with the lower boiling aromatic hydrocarbons.

The following examples are offered by way of illustration and not by way of limitation.

*Example I*

Into a reaction vessel was introduced 30.1 g. of aluminum chloride and 18.9 g. of silver chloride and the mixture heated under nitrogen to 145° C. for 15 minutes. The mixture formed a clear brown solution. While cooling, 150 ml. of toluene was added to this complex. When the temperature dropped to 50° C., 33.6 g. of aluminum chloride was added with hydrogen sparging through the reaction mixture. This was followed by the addition of 10 g. of 5 percent palladium on carbon. While maintaining the temperature at 50° C., hydrogen sparging was continued for 3 hours followed by hydrogen chloride sparging for 11 hours. Dilute hydrogen chloride was then added to the mixture, the aqueous layer separated, the organic layer washed with base followed by water, dried and the solvent removed. The crude product weighed 12.87 g.

The product was then distilled, a portion boiling in the range of 124° to 135° C. at 4 mm. Hg. and the remainder boiling in the range of 110° to 185° C. at 0.1 mm. Hg. The residue remaining after this distillation had a molecular weight of 532 (ThermoNAM—Differential Vapor Pressure Technique).

*Example II*

Into a reaction flask was introduced 30.15 g. of aluminum chloride and 18.9 g. of silver chloride and heated to 150° C. for 15 minutes in a nitrogen atmosphere. The aluminum chloride-silver chloride complex formed as a tan clear solution. The temperature was allowed to drop to 110° C. and 150 ml. of toluene added followed by the addition of 33.6 g. of aluminum chloride. The temperature was maintained at 110° C. for 30 minutes at which time anhydrous hydrogen chloride was introduced at a slow steady rate. After two hours (no reaction had apparently occurred) the mixture was cooled to 80° C. and 10 g. of 5 percent rhodium on alumina added. Refluxing was maintained with continuous addition of anhydrous HCl over a period of 18 hours. At the end of this time, the reaction mixture was cooled and dilute hydrogen chloride added. The aqueous solution was separated, extracted with benzene and the benzene phase combined with the toluene. The benzene-toluene mixture was washed with dilute potassium hydroxide, followed by water washing until neutral. The volatile solvents were stripped yielding 61.78 g. of a crude yield.

The product was then separated by distillation, first distilling at 4 mm. Hg and separating the distillate into two fractions: (1) distilling up to 120° C.; and (2) 130° to 170° C. The pressure was then reduced to 0.2 mm. Hg and 6 fractions taken as follows: (3) 150°–173° C.; (4) 178°–182° C.; (5) 178° C.; (6, 7) 188°–200° C.; (8, 9) 210° C. (10) 240° C.; and residue was left.

The residue was then chromatographed on alumina column and divided into three fractions: benzene and benzene/ether eluted fraction; ether/methanol eluted fraction; and a non-chromatographicable fraction (benzene extracted from alumina), the fractions referred to as A, B, and C, respectively. The following is the analysis of the three fractions: (A) mol. wt., 515 (Thermo-NAM); (B) C, 87.6%—H, 6.0%—Cl, 0.79—mol. wt., 730 (ThermoNAM); (C) C, 82.9%—H, 6.26%. (It would appear from the latter two analyses, that oxygen had been absorbed by the product.)

The pot residue had an analysis of C, 92.3%; H, 6.82%; mol. wt., 532 (ThermoNAM).

It is evident from the above that dimers and higher polymers of aromatic hydrocarbons may be obtained according to the process of this invention. Polymers having as many as 10 units may be achieved. These high molecular weight polycyclic products may be used as thermally stable inert solvents, polymer additives, and intermediates for other products. Particularly, the methylated or other alkylated aromatic hydrocarbons may be oxidized to form polycarboxylic aryl compounds which may be used in polymerizations, for mild acid or base catalysts, as polymer additives, etc.

As will be evident to those skilled in the art, various modifications on this invention may be made or followed, in the light of the foregoing disclosure and discussion, without departing from the spirit or scope of the disclosure or from the scope of the following claims.

I claim:

1. A method for preparing polycyclic aromatic hydrocarbons of higher molecular weight which comprises contacting aromatic hydrocarbons of from 6 to 12 carbon atoms with an aluminum chloride-silver chloride complex, comprising from about 1 to 5 moles of aluminum chloride per mole of silver chloride, in the presence of anhydrous hydrogen chloride and a noble metal dehydrogenation catalyst at a temperature in the range of from about 80° to 200° C.

2. A method according to claim 1, wherein said complex is present in a weight ratio to said aromatic hydrocarbon in the range of 1:1–20 and from about 0 to 2 parts of aluminum chloride is present per part of complex.

3. A method according to claim 2, wherein said aromatic hydrocarbon is toluene.

4. A method of preparing polytoluene which comprises contacting from about 1 to 10 parts of toluene with about 1 part of aluminum chloride-silver chloride complex having from about 1.5 to 3 moles of aluminum chloride per mole of silver chloride in the presence of from about 0.5 to 1.2 parts of aluminum chloride per part of complex catalyst and a noble metal dehydrogenation catalyst present in at least about 0.05 weight percent of the solution at a temperature in the range of from about 90° to about 175° C.

5. A method according to claim 4, wherein said noble metal dehydrogenation catalyst is rhodium.

6. A method according to claim 4, wherein said noble metal dehydrogenation catalyst is palladium.

References Cited

UNITED STATES PATENTS

| | | | |
|---|---|---|---|
| 2,631,174 | 3/1953 | Ipatieff et al. | 260—670 X |
| 2,742,512 | 4/1956 | Schneider | 260—670 X |
| 2,999,120 | 9/1961 | Wilgus | 260—670 X |

DELBERT E. GANTZ, *Primary Examiner.*

C. R. DAVIS, *Assistant Examiner.*